United States Patent [19]
Pawlak et al.

[11] Patent Number: 5,070,956
[45] Date of Patent: Dec. 10, 1991

[54] ELECTROMAGNETIC CONTROL APPARATUS FOR VARYING THE DRIVER STEERING EFFORT OF A HYDRAULIC POWER STEERING SYSTEM

[75] Inventors: Andrzej M. Pawlak, Troy; David W. Graber, Millington, both of Mich.

[73] Assignee: General Motors Corporation, Detroit, Mich.

[21] Appl. No.: 597,922

[22] Filed: Oct. 9, 1990

[51] Int. Cl.⁵ .............................................. B62D 5/083
[52] U.S. Cl. .................................. 180/132; 180/141; 180/148
[58] Field of Search .............. 180/141, 142, 143, 147, 180/148, 79.1, 132; 74/388 PS; 310/36, 39; 192/84 E, 84 R

[56] References Cited

U.S. PATENT DOCUMENTS

| | | | |
|---|---|---|---|
| 4,778,021 | 10/1988 | Morishata et al. | 180/79.1 |
| 4,871,040 | 10/1989 | Zuraski et al. | 180/142 |
| 4,886,137 | 12/1989 | Pawlak et al. | 180/142 |
| 4,886,138 | 12/1989 | Graber et al. | 180/142 |

FOREIGN PATENT DOCUMENTS 0099167  6/1984  Japan ............................. 192/84 R

OTHER PUBLICATIONS

Patent Abstracts of Japan, vol. 011086, Apr. 17, 1985, Publication No. 61241271, Isamu, Chikuma, "Steering Force Control Device for Power Steering Device".

Primary Examiner—Charles A. Marmor
Assistant Examiner—Victor E. Johnson
Attorney, Agent, or Firm—Mark A. Navarre

[57] ABSTRACT

A hydraulic power steering system having conventional relatively rotatable spool and valve body elements for flow regulation, a mechanically resilient element for generating a mechanical centering force in relation to the relative rotation of the spool and valve body to a centered condition, and an integral electromagnetic mechanism which variably assists the mechanical centering force to adjust the level of operator steering input required to produce a given level of power assist. The electromagnetic mechanism comprises an energized coil and a pair of flux conducting elements supported for rotation with the spool and valve body, respectively. The flux conducting elements are radially spaced annular elements with opposed teeth, which elements are magnetically coupled to the coil to define a magnetic circuit having an intertooth working air gap which varies the magnetic reluctance of the circuit with the relative rotation of the spool and valve body such that the teeth are aligned and the reluctance minimized when the spool and valve body are centered.

6 Claims, 4 Drawing Sheets

ELECTROMAGNETIC CONTROL APPARATUS FOR VARYING THE DRIVER STEERING EFFORT OF A HYDRAULIC POWER STEERING SYSTEM

FIELD OF THE INVENTION

This invention relates to an automotive hydraulic power assist steering system, and more particularly, to an electromagnetic control apparatus for varying the driver steering effort required to produce a given level of power assist.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing and a spool rotatably disposed within the valve body. Hydraulic fluid is supplied to a cavity formed in the spool, and the valve body is grooved to receive fluid flow in relation to the amount of relative rotation between the spool and valve the body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body and to permit relative rotation therebetween in relation to operator exerted steering torque, at least within the limitations of the lost motion coupling.

In systems of the type described above, the level of driver steering effort assist required to produce a given level of power assist depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

To overcome the engineering tradeoff described above, various arrangements have been proposed for varying the driver steering effort for a given level of power assist as a function of vehicle speed. An example of one such arrangement is given in U.S. Pat. No. 4,629,025, issued to Brasier et al., Dec. 16, 1986, and assigned to the assignee of the present invention. In that arrangement, a controlled portion of the hydraulic fluid pump output is returned to the reservoir of the pump to reduce fluid flow to the steering actuator with increasing vehicle speed.

Other U.S. patents assigned to the assignee of the present invention and related to varying the driver steering effort by an electromagnetic mechanism are U.S. Pat. No. 4,871,040 to Zuraski et al. issued Oct. 3, 1989; U.S. Pat. No. 4,886,137 to Pawlak et al. issued Dec. 12, 1989; and U.S. Pat. No. 4,886,138 to Graber et al, issued Dec. 12, 1989. Each of these patents discloses a power steering unit having a torsion bar with a spring rate which establishes the base steering effort, and an electromagnetic device acting as a magnetic spring or torque motor coupled to the torsion bar for varying the effective spring rate of the torsion bar, and thus varying the driver steering effort. In some cases the electromagnetic devices include a permanent magnet as part of the torque motor mechanism although the Pawlak et al. patent does not utilize a permanent magnet for its operation.

SUMMARY OF THE PRESENT INVENTION

The present invention is directed to a hydraulic power assist steering system having conventional relatively rotatable spool and valve body elements for flow regulation, and an integral electromagnetic mechanism which defines a coupling of variable resilience between the spool and valve body for adjusting driver steering effort required to produce a given level of power assist.

The integral electromagnetic mechanism of this invention comprises a magnetic assembly which includes two rotary flux conducting elements supported for rotation with each of the spool and valve body elements, and a stationary exciting coil magnetically coupled thereto to provide a flux path through the two flux conducting elements and through an air gap between the elements. The flux conducting elements each have an equal number of teeth projecting into the gap toward the other such element to vary the reluctance of the air gap upon relative rotation. No permanent magnet is used.

When the exciting coil is energized with direct current, the teeth of each rotary element define electromagnetic poles which interact with the poles of the other element. The electromagnetic poles are oriented such that when the spool and valve body elements are centered, the poles are radially aligned. This produces an attractive force between the electromagnetic magnet poles, and a positive magnetic centering torque when there is relative displacement of the spool and valve body elements, which torque tends to restore the assembly to the centered position. The magnitude of the magnetic centering torque is variable over a wide range depending on the magnitude of current supplied to the coil.

In the illustrated embodiment, the mechanism of this invention is used in combination with a conventional torsion bar to define a variable resiliency coupling between the hydraulic fluid supply elements. The torsion bar provides a mechanical centering torque which defines a coupling of low resilience which tends to restore the assembly to the centered position when there is relative displacement of the spool and valve body elements. This generates a low level of steering assist for a given driver steering input. Variably energizing the exciting coil with DC current produces positive magnetic centering torque which variably increases the resilience of the coupling so that more driver steering effort is required to produce a given level of power assist. Preferably, the coil energization is scheduled in relation to the speed of the vehicle so that the level of steering assist decreases with increasing vehicle speed. A driver preference input may also be used.

DESCRIPTION OF THE PREFERRED EMBODIMENT

Figure 1:
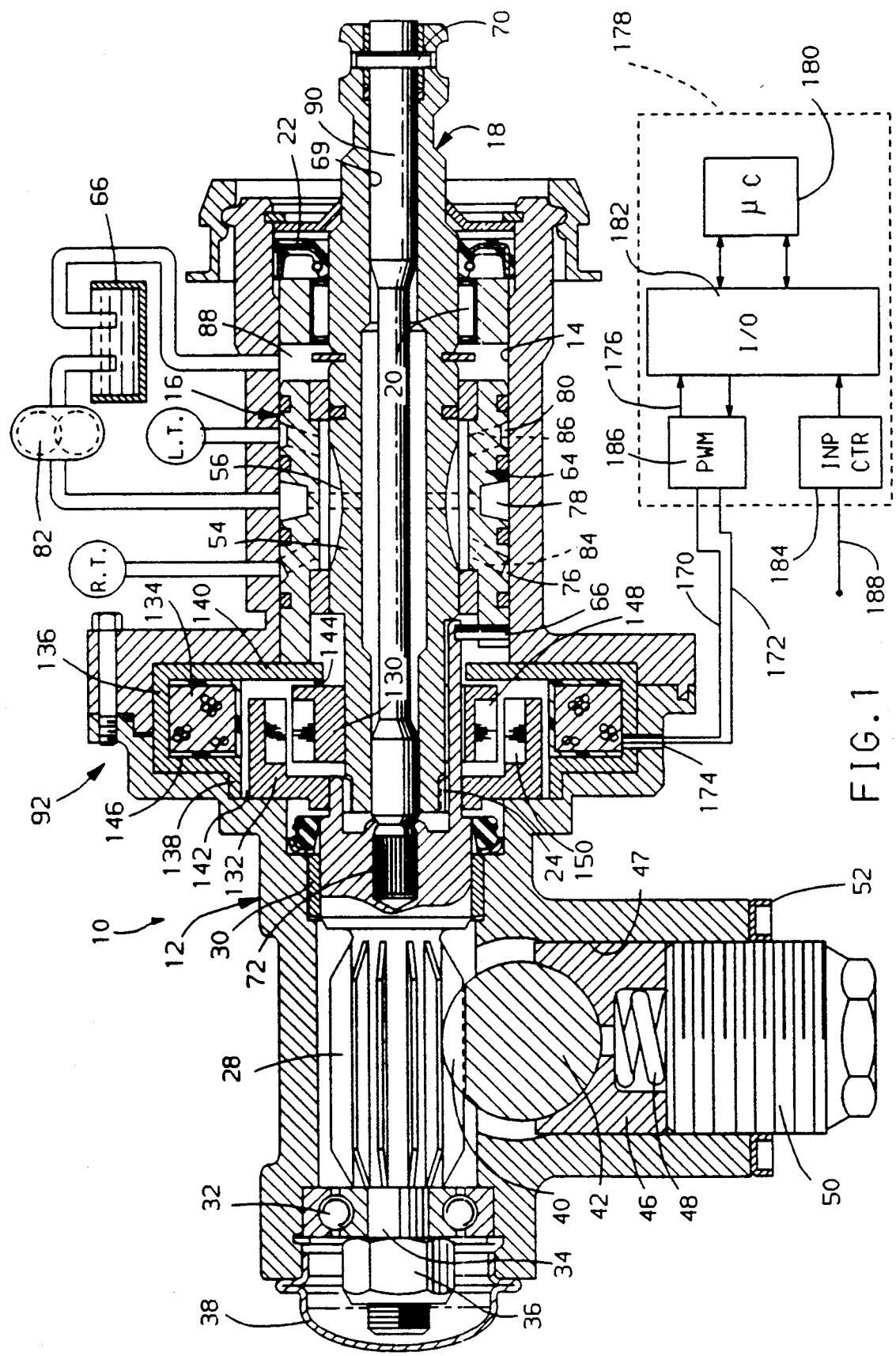
FIG. 1 is a sectional view of a hydraulic control valve assembly incorporating the integral electromagnetic
Figure 5:
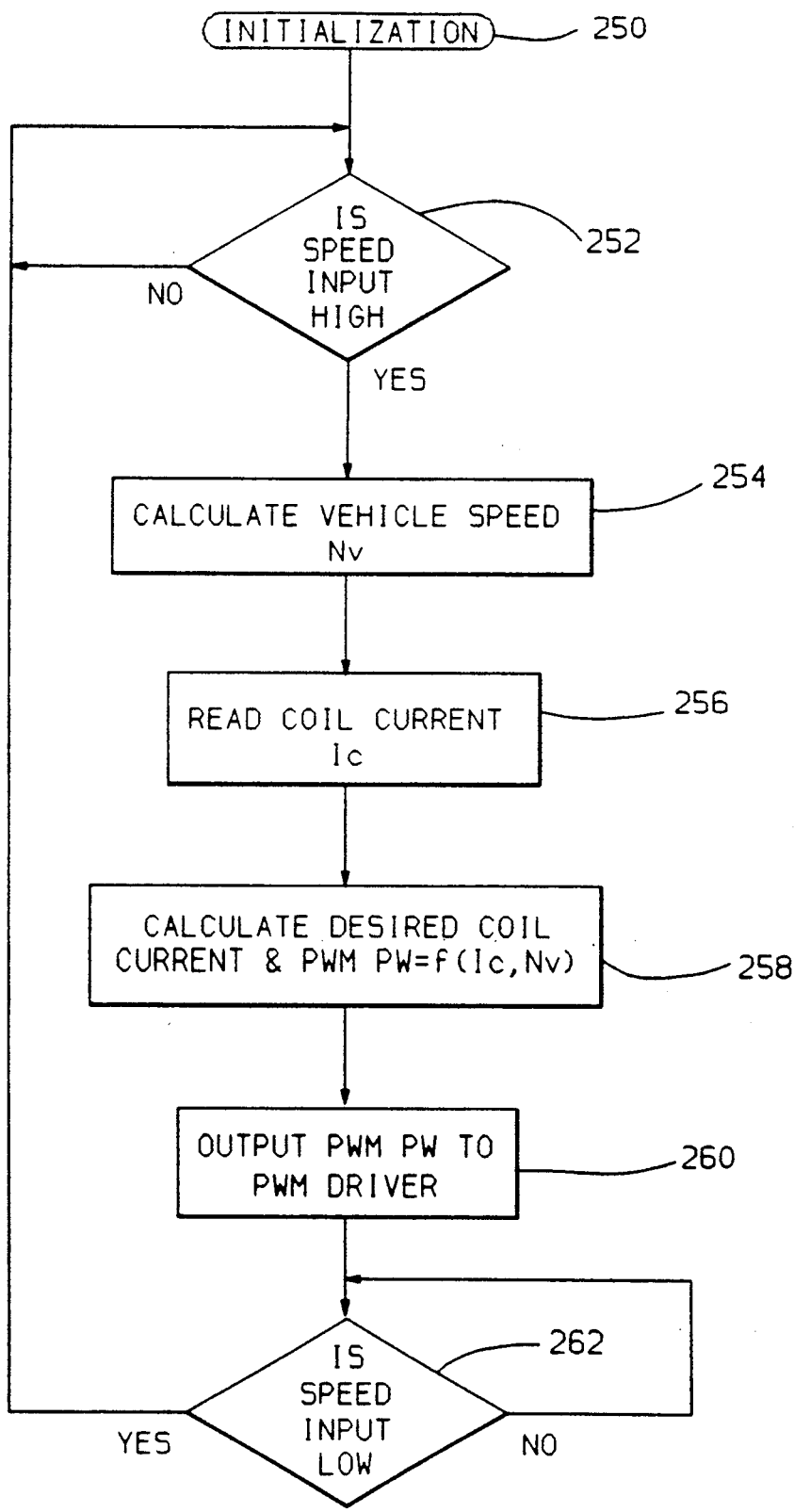
FIG. 5 is a flow diagram representative of computer program instructions executed by the computer based controller of FIG. 1 in controlling the excitation of the electromagnetic mechanism of this invention.

Referring particularly to FIGS. 1 and 5, the reference numeral 10 generally designates a portion of a motor vehicle hydraulic power assist rack and pinion steering gear. The steering gear 10 is disposed within a two-piece housing 12 having a cylindrical smooth wall bore 14 formed therein. A cylindrical rotary power steering gear valve assembly 16 disposed within the bore 14 includes an elongated cylindrical spool shaft 18 mounted for turning movement in the housing 12 by a bearing assembly 20. The inboard end of spool shaft 18 projects through an annular fluid seal 22 for connection to a conventional steering shaft and operator manipulated handwheel, not shown.

The outboard end of the spool shaft 18 is splined, as indicated by the reference numeral 24, with an elongated pinion gear 28 to define a rotary lost motion mechanical coupling therebetween. The pinion gear 28 is rotatably mounted in the housing 12 by the sleeve bearing 30 and a ball bearing assembly 32 which receives a shank portion 34 of pinion gear 28. A nut 36 threaded onto the outboard end of the shank portion 34 secures the pinion gear 28 with the housing 12. A cup-like cover 38 frictionally fits into the end of the housing 12 to provide service access.

The teeth of pinion gear 28 mesh with the toothed portion 40 of an elongated rack 42 mounted for linear sliding movement within the housing 12. The rack 42 is operatively connected to the steerable wheels of the vehicle by suitable ball joints and tie rods, not shown. In such an arrangement, the linear movement of the rack turns the steerable wheels of the vehicle for vehicle steering purposes.

The rack 42 is also coupled to a fluid operated power cylinder mechanism or actuator, not shown, for applying a steering assist force to rack 42. As described below, the power steering valve assembly 16 is adapted to direct hydraulic fluid to right or left turn chambers of the power cylinder to apply right-hand or left-hand steering assist force to rack 42. A power cylinder meeting the above description is described in detail in U.S. Pat. No. 4,454,801 to Spann, issued June 19, 1984, and assigned to the assignee of the present invention.

Close meshing engagement between the teeth of the pinion 28 and the rack 42 is achieved by the rack contact shoe 46 which is slidably mounted in the housing bore 47. A helical spring 48 seated between the contact shoe 46 and an adjusting plug 50, tensions the contact shoe 46. Plug 50 is threaded into the end of housing bore 47 and can be axially adjusted therein to vary the spring force. An adjuster plug nut 52 maintains the plug 50 in a selected position.

The spool shaft 18 of the power steering valve assembly 16 has a cylindrical valve spool 54 formed thereon. The spool 54 has a plurality of arcuate, axially extending oil transfer slots 56 formed in the periphery thereof. The valve assembly 16 also includes a cylindrical valve body 64 rotatably mounted within valve bore 14 on the valve spool 54. The outboard end of the valve body 64 extends over the end of the pinion 28 and is drivingly connected thereto by radial pin 66.

The valve body 64 defines right turn, supply and left turn chambers 76, 78, 80 between it and the valve bore 14. A hydraulic pump 82 supplies fluid to the supply chamber 78 and such fluid is directed to the right turn and left turn chambers 76, 80 via the slots 56 of valve spool 54 and the drilled passages 84 and 86, depending on the direction and degree of relative rotation between spool 54 and valve body 64. The right turn and left turn chambers 76, 80 are connected to the right (RT) and left (LT) chambers of the power cylinder (actuator) as indicated for generating a corresponding level of steering assist force in rack 42 as described above. An exhaust passage chamber 88 returns hydraulic fluid to the fluid reservoir 66 of pump 82. A detailed description of the valve 16 and the hydraulic system thereof is set forth in the above-referenced U.S. Pat. No. 4,454,801.

A resilient centering coupling between the valve spool 54 and valve body 64 is provided by the combined operation of a torsion bar 90 and the electromagnetic mechanism of this invention, generally designated by the reference numeral 92. Together, the torsion bar 90 and electromagnetic mechanism 92 permit the valve spool 54 to be rotated relative to the valve body 64 in relation to the operator exerted steering torque so that the valve 16 directs fluid to the power cylinder (not shown) for producing the desired level of steering assist force. On termination of the operator exerted steering torque, the torsion bar 90 and electromagnetic mechanism 92 center the valve body 64 and spool 54 to terminate steering assist force.

The torsion bar 90 extends concentrically through an axial opening 69 in the spool shaft 18. A cross pin 70 connects the input end of torsion bar 90 to spool shaft 18. The output end of torsion bar 90 is splined and staked at 72 to the pinion 28.

The electromagnetic mechanism 92 comprises a first annular toothed pole piece 130 supported for rotation with the valve spool 54, a second annular toothed pole piece 132 supported for rotation with the pinion 28 and valve body 64, and a stationary exciting coil 134 magnetically coupled thereto through a stationary core element 136.

The coil 134 is wound in an insulating bobbin 146, and has lead ends 170, 172 passing through a suitable opening 174 in the housing 12 for connection to the computer-based control unit 178, described below. The stationary core element 136, which may conveniently be made of two cooperating pieces, surrounds the sides and outer circumference of the coil 134 and includes two extensions 138 and 140 for coupling flux to the rotary pole pieces 130, 132. On one side of the core element 136, an integral foot-shaped extension 138 is spaced radially from the outer circumference of the pole piece 132 to form one air gap 142, and on the other side of the core element 136, the extension 140 extends radially inwardly adjacent a side of the pole piece 130 to define a small air gap 144 with the pole piece. The core element 136 is enclosed in the housing 12 which is of nonmagnetic material to avoid influence of the flux path in the electromagnetic mechanism.

Figure 2:
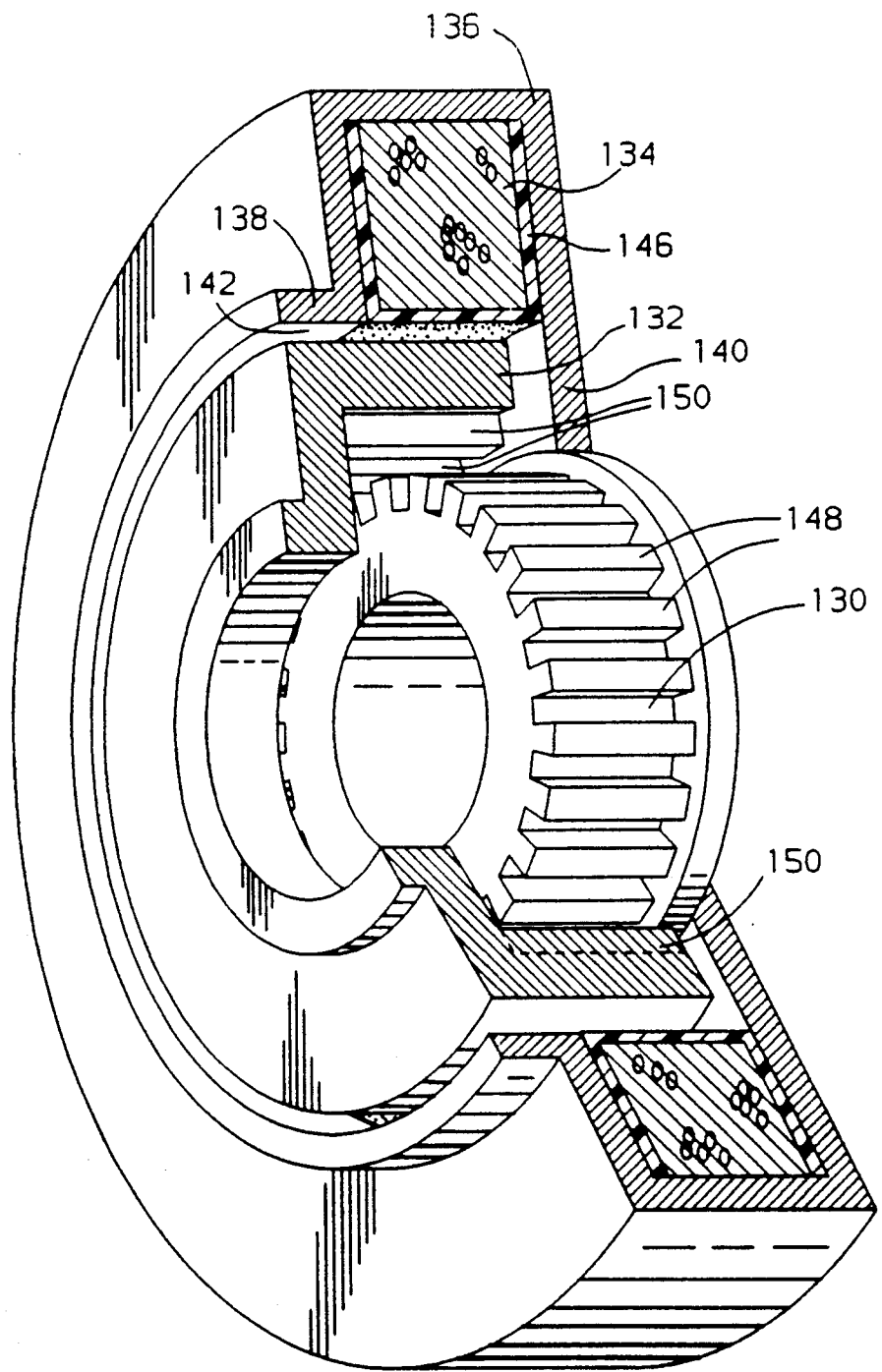
FIG. 2 is a partly broken away isometric view of the electromagnetic mechanism of FIG. 1.

As best shown in FIG. 2, the pole pieces 130 and 132 have teeth 148 and 150, respectively, which are equal in number and are aligned when the spool 54 and valve body 64 are centered. This state is magnetically preferred because it presents the lowest reluctance path for the magnetic flux. For a given direction of energization current, the teeth 148 are the same polarity and the teeth 150 are all of the opposite polarity. When there is relative rotation of the spool and valve body elements 54, 64, opposite polarity teeth 148, 150 become radially misaligned. This increases the reluctance of the flux path and thereby results in the production of a positive magnetic centering torque which tends to restore the assembly to the preferred or centered position.

Figure 3:
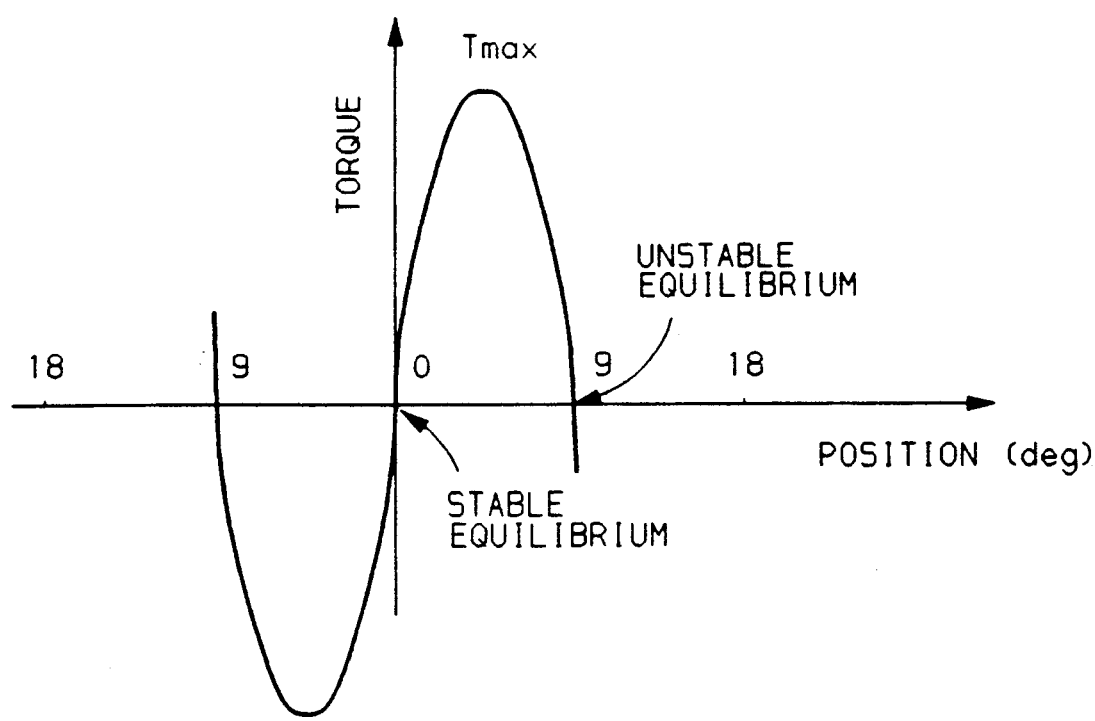
FIG. 3 depicts the centering force generated by the electromagnetic mechanism of FIG. 1 as a function of steering shaft rotation for a given coil current.

FIG. 3 depicts the torque for a particular current value. The magnitude of the magnetic centering torque (positive or negative) varies substantially sinusoidally in relation to the degree of misalignment, or relative displacement of the spool and valve body elements 54, 64 and the current supplied to the exciting coil 134. In the case where each pole piece 130, 132 has twenty teeth, one pole pitch is 18 degrees. Stable equilibrium occurs when the teeth are aligned at the 0 degree position and an unstable equilibrium position occurs at 9 degrees or ½ pole pitch displacement. It is apparent that for a displacement up to 9 degrees in either direction from the center position, a torque will develop in a direction to return the pole pieces to the stable center position. It is further apparent that for a displacement up to about 4 degrees in either direction, the centering force increases somewhat linearly with respect to displacement.

The effective resiliency of the coupling between valve spool 54 and valve body 64 is determined by the sum of the mechanical centering forces of the torsion bar 90 and the magnetic centering force of the electromagnetic apparatus of this invention. The combined centering force is depicted as a function of relative displacement in FIG. 4. The torsion bar centering force is fixed for a given installation, but the magnetic centering force is variable with the exciting coil energization current magnitude, and results in an overall centering force as represented by the family of curves shown in FIG. 4 and described below. Preferably, the coil current is scheduled in relation to the vehicle speed to provide a speed-dependent relationship between the operator input torque and the power assist torque. The centering force is the same for either direction of current.

The computer-based control unit 178 of FIG. 1 is supplied with operating power from the vehicle storage battery (not shown), and comprises a microcomputer (uC) 180, an input/output (I/O) device 182, an input counter (INP CTR) 184, and a pulse-width-modulation driver (PWM) 186, all of which may be conventional devices. The microcomputer 180 communicates with the remainder of the system via I/O device 182; in response to various input information, microcomputer 180 executes a series of predetermined program instructions for developing an output command pertaining to the required energization of the exciting coil 134. Program instructions are described below in reference to the flow diagram of FIG. 5.

The primary control unit input is an oscillatory vehicle speed signal on line 188, which may be obtained from a conventional speed pickup, not shown. The speed signal is applied to the I/O device 182 through the input counter 184, which divides the frequency of the speed signal by a predetermined factor. The PWM command for exciting coil 134 is applied to a PWM driver 186 for correspondingly modulating the coil 134 with current from the vehicle storage battery, not shown. A signal indicative of the coil current is developed by the PWM driver 186 on line 176 with a suitable current shunt, such signal being applied as an input to an analog port of the I/O device 182 for use in a closed-loop control of the coil current. Open-loop voltage control may alternately be employed, if desired.

Figure 4:
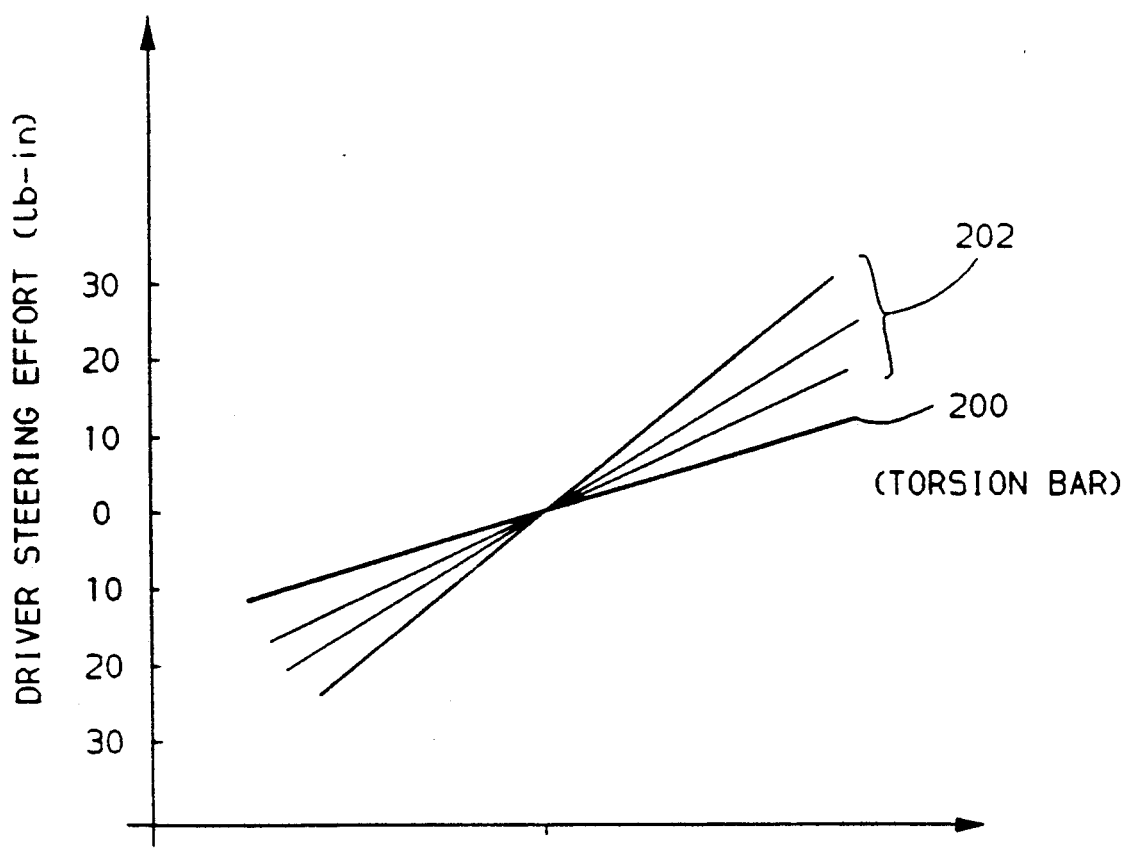
FIG. 4 depicts the variation in driver steering effort achieved by the control valve and controller of FIG. 1 for various energization currents of the electromagnetic mechanism.

According to the illustrated embodiment, the effect of the torsion bar 90 with no energization current for the electromagnetic mechanism is a high level of steering assist for a low level of driver effort, represented by the trace 200 in FIG. 4. This level of assist is most suitable for a low vehicle speed. With increasing vehicle speed, the control unit 178 begins energizing the exciting coil 134 with progressively increasing levels of current to increase the driver steering effort per unit relative displacement of the valve spool 54 and valve body 64, as indicated by the traces 202.

The maximum relative displacement limits are defined by the splined lost motion coupling between spool shaft 18 and pinion gear 28. Once the maximum displacement has occurred, further rotation of the steering wheel is mechanically transmitted to the pinion gear 28 via the coupling. In the illustrated embodiment, the coupling permits relative displacements of approximately 4.5 mechanical degrees in either direction, the region over which the slope of the magnetic centering force is positive—that is, the region over which increased relative displacement produces increased magnetic centering force. However, it is preferred to restrict the movement to a slightly smaller range where the centering force is somewhat linear.

Regardless of the control method employed, FIG. 5 depicts a simplified flow diagram representative of computer program instructions which would be executed by the computer-based control unit 178 of FIG. 1 in carrying out the control. The block 250 designates a series of program instructions executed at the initiation of each period of vehicle operation for initializing the various registers and program variables to predetermined values. Thereafter, the blocks 252-262 are executed as explained below.

The decision blocks 252 and 262 detect a low to high transition of the vehicle speed signal output of input counter 184. When the transition is detected, the instruction blocks 254, 256, 258 and 260 are sequentially executed to calculate the vehicle speed Nv, to read the coil current value Ic, and to calculate and output a PWM pulse width to the PWM driver 186. Calculation of the vehicle speed at block 254 is based on the elapsed time between low-to-high transitions of the input counter carry bit, such time being inversely proportional to vehicle speed Nv. Calculation of the PWM pulse width command is based on the deviation of the desired coil current from the measured coil current Ic, the desired current being determined in accordance with vehicle speed, as indicated in FIG. 4.

While this invention has been described in reference to the illustrated embodiment, various modifications will occur to those skilled in the art. In essential form, the control apparatus of this invention comprises relatively rotatable pole pieces with opposed teeth in an electromagnetic circuit. The function of the circuit can be achieved with alternate (such as disk) configurations, and it should be understood that the scope of this invention is defined solely by the appended claims. Moreover, various control parameters, such as driver preference (light, medium, or heavy effort) or pressure feedback may be used, either separately or in combination with the above-described vehicle speed parameter.

The embodiments of the invention in which an exclusive property or privilege is claimed are defined as follows:

1. In a vehicular power assist steering system wherein a pair of relatively rotatable hydraulic elements are connected between a driver manipulated steering shaft and a steering gear for generating hydraulic flow and power assist in relation to their relative rotation, apparatus for rotatably coupling said hydraulic elements, comprising:

mechanical resilient means coupling the hydraulic elements for producing mechanical centering force in relation to the relative rotation of the hydraulic elements in a direction to restore said elements to a centered condition of minimum hydraulic flow; and means for producing a magnetic centering force for restoring the elements to a centered condition including a pair of relatively rotatable pole pieces each connected to one of the pair of hydraulic elements for movement therewith, each of the pole pieces having teeth extending toward corresponding teeth of the other pole piece, and an air gap between corresponding teeth, and a stationary annular excitation coil disposed around the rotatable pole pieces and flux conducting means for coupling flux between the excitation coil and the pair of rotatable pole pieces, so that magnetic flux produced when the excitation coil is energized causes a torque tending to align the corresponding teeth of the pole pieces whereby the sum of the torque developed by the mechanical resilient means and the torque developed by the electromagnetic apparatus determines the level of power assist.

2. The invention as defined in claim 1 wherein the pole pieces are arranged such that the teeth are aligned when the hydraulic elements are centered whereby when the teeth are offset the magnetic flux causes a torque in a direction to center the hydraulic parts.

3. The invention as defined in claim 1 wherein the pole pieces comprise inner and outer radially spaced pole pieces and the teeth on each pole piece extend radially toward the corresponding teeth of the other pole piece.

4. The invention as defined in claim 3 wherein each tooth of the outer pole piece is radially aligned with a corresponding tooth of the inner pole piece when the hydraulic parts are centered so that torque arising from magnetic forces tend to center the hydraulic parts.

5. In a vehicular power assist steering system having first and second relatively rotatable hydraulic elements connected between a driver manipulated steering shaft and a steering gear for generating hydraulic flow in relation to their relative rotation, apparatus for variably coupling said hydraulic elements to vary the level of steering assist produced for a given driver manipulation of said steering shaft, comprising:

mechanical resilient means connected between said relatively rotatable hydraulic elements for developing a mechanical centering force in relation to such relative rotation which tends to restore said elements to a centered condition of minimum hydraulic flow; and electromagnetic resilient means including an energized coil and first and second toothed flux conducting elements magnetically coupled to said coil and fixed to said first and second hydraulic elements, respectively, for rotation therewith, the coil and flux conducting elements defining a magnetic circuit having a working air gap, the flux conducting elements being angularly oriented such that each tooth of one element is aligned with a corresponding tooth of the other element across the air gap to minimize magnetic reluctance of the magnetic circuit when said hydraulic elements are in centered condition, whereby when said hydraulic elements are relatively displaced from said centered condition, the magnetic circuit develops a net magnetic attractive force which aids the mechanical centering torque in relation to the energization of said coil.

6. The invention as defined in claim 5 wherein the first and second toothed flux conducting elements comprise radially spaced annular elements.

* * * * *